US012315335B2

(12) United States Patent
Cockerill et al.

(10) Patent No.: US 12,315,335 B2
(45) Date of Patent: May 27, 2025

(54) REAL TIME FEEDBACK AND RECOMMENDATIONS ON MARKET SELECTIONS

(71) Applicant: STATS LLC, Chicago, IL (US)

(72) Inventors: Nick Cockerill, Leeds (GB); Christian Marko, Graz (AT); John Dickinson, Leeds (GB)

(73) Assignee: STATS LLC, Chicago, IL (US)

( * ) Notice: Subject to any disclaimer, the term of this patent is extended or adjusted under 35 U.S.C. 154(b) by 162 days.

(21) Appl. No.: 17/813,713

(22) Filed: Jul. 20, 2022

(65) Prior Publication Data

US 2023/0027077 A1 Jan. 26, 2023

Related U.S. Application Data

(60) Provisional application No. 63/203,368, filed on Jul. 20, 2021.

(51) Int. Cl.
*G07F 17/32* (2006.01)
*G06Q 50/34* (2012.01)

(52) U.S. Cl.
CPC .......... *G07F 17/323* (2013.01); *G06Q 50/34* (2013.01); *G07F 17/3288* (2013.01)

(58) Field of Classification Search
CPC .... G07F 17/323; G07F 17/3288; G06Q 50/34
See application file for complete search history.

(56) References Cited

U.S. PATENT DOCUMENTS

| | | | | |
|---|---|---|---|---|
| 8,287,345 | B2 | 10/2012 | Gross et al. | |
| 8,602,884 | B1 | 12/2013 | Marantelli | |
| 10,282,940 | B2 | 5/2019 | Griffin | |
| 10,431,044 | B2 | 10/2019 | Marantelli | |
| 2017/0140605 | A1* | 5/2017 | Lewski | G07F 17/3288 |
| 2020/0133452 | A1* | 4/2020 | Gupta | G06N 20/00 |
| 2021/0118265 | A1 | 4/2021 | Joao | |
| 2022/0092914 | A1* | 3/2022 | Huke | G06N 20/00 |
| 2023/0112232 | A1* | 4/2023 | Huke | G07F 17/3269 463/20 |
| 2024/0046742 | A1* | 2/2024 | Steinberg | G07F 17/3237 |
| 2024/0062612 | A1* | 2/2024 | Huke | G07F 17/3211 |

OTHER PUBLICATIONS

PCT International Application No. PCT/US22/37678, International Search Report and Written Opinion of the International Searching Authority, dated Oct. 25, 2022, 8 pages.

* cited by examiner

*Primary Examiner* — James S. McClellan
*Assistant Examiner* — Ross A Williams
(74) *Attorney, Agent, or Firm* — Bookoff McAndrews, PLLC

(57) ABSTRACT

A computing system receives a proposed bet selection for an event. The proposed bet selection includes team information and opponent information. The computing system generates a plurality of queries by analyzing the proposed bet selection. The computing system retrieves historical data related to the proposed bet selection based on the plurality of queries. The computing system analyzes the historical data to generate a plurality of insights related to the proposed bet selection. The computing system provides the historical data and the plurality of insights to a user submitting the proposed bet selection.

20 Claims, 7 Drawing Sheets

500

REAL TIME FEEDBACK AND RECOMMENDATIONS ON MARKET SELECTIONS

CROSS-REFERENCE TO RELATED APPLICATIONS

This application claims priority to U.S. Provisional Application Ser. No. 63/203,368, filed Jul. 20, 2021, which is hereby incorporated by reference in its entirety.

FIELD OF THE DISCLOSURE

The present disclosure generally relates to system and method for generating real-time feedback and recommendations on market selections.

BACKGROUND

Over several years, sports betting operators have significantly increased the number and type of markets a potential bettor can place a wager on. Additionally, the introduction of "request a bet" or "build a bet" products means that the number of possible combinations into an accumulator or parlay is essentially limitless.

SUMMARY

In some embodiments, a method is disclosed herein. A computing system receives a proposed bet selection for an event. The proposed bet selection includes team information and opponent information. The computing system generates a plurality of queries by analyzing the proposed bet selection. The computing system retrieves historical data related to the proposed bet selection based on the plurality of queries. The computing system analyzes the historical data to generate a plurality of insights related to the proposed bet selection. The computing system provides the historical data and the plurality of insights to a user submitting the proposed bet selection.

In some embodiments, a system is disclosed herein. The system includes a processor and a memory. The memory has programming instructions stored thereon, which, when executed by the processor, causes the system to perform operations. The operations include receiving a proposed bet selection for an event. The proposed bet selection includes team information and opponent information. The operations further include generating a plurality of queries by analyzing the proposed bet selection. The operations further include retrieving historical data related to the proposed bet selection based on the plurality of queries. The operations further include analyzing the historical data to generate a plurality of insights related to the proposed bet selection. The operations further include providing the historical data and the plurality of insights to a user submitting the proposed bet selection.

In some embodiments, a non-transitory computer readable medium is disclosed herein. The non-transitory computer readable medium includes one or more sequences of instructions that, when executed by one or more processors, causes a computing system to perform operations. The operations include receiving, by the computing system, a proposed bet selection for an event. The proposed bet selection includes team information and opponent information. The operations further include generating, by the computing system, a plurality of queries by analyzing the proposed bet selection. The operations further include retrieving, by the computing system, historical data related to the proposed bet selection based on the plurality of queries. The operations further include analyzing, by the computing system, the historical data to generate a plurality of insights related to the proposed bet selection. The operations further include providing, by the computing system, the historical data and the plurality of insights to a user submitting the proposed bet selection.

BRIEF DESCRIPTION OF THE DRAWINGS

So that the manner in which the above recited features of the present disclosure can be understood in detail, a more particular description of the disclosure, briefly summarized above, may be had by reference to embodiments, some of which are illustrated in the appended drawings. It is to be noted, however, that the appended drawings illustrated only typical embodiments of this disclosure and are therefore not to be considered limiting of its scope, for the disclosure may admit to other equally effective embodiments.

To facilitate understanding, identical reference numerals have been used, where possible, to designate identical elements that are common to the figures. It is contemplated that elements disclosed in one embodiment may be beneficially utilized on other embodiments without specific recitation.

DETAILED DESCRIPTION

Currently, a bettor is at a significant disadvantage as the prices generated by an operator (e.g., sportsbook) are typically based on complex trading models that take into account a significant volume of data. In comparison, an average customer or bettor only has very high-level information at their disposal to base their decisions. This has resulted in a win margin for operators for certain high-volume accumulator/parlay bets at over 40% for multi-bet (e.g., accumulator or parlay) versus around 10% for single line bets.

To account for this difference, one or more techniques provided herein provide bettors with more granular information to base their decisions. For example, one or more techniques described herein may provide a bettor with real-time feedback at a selection and combined selection levels, as well as recommendations based on both actual data and generated predictions.

While the below discussion is with respect to placing a bet with an operator, such as a sports book or casino, those skilled in the art understand that these techniques may be applied more generally to the fantasy sports or free gaming space.

Figure 1:
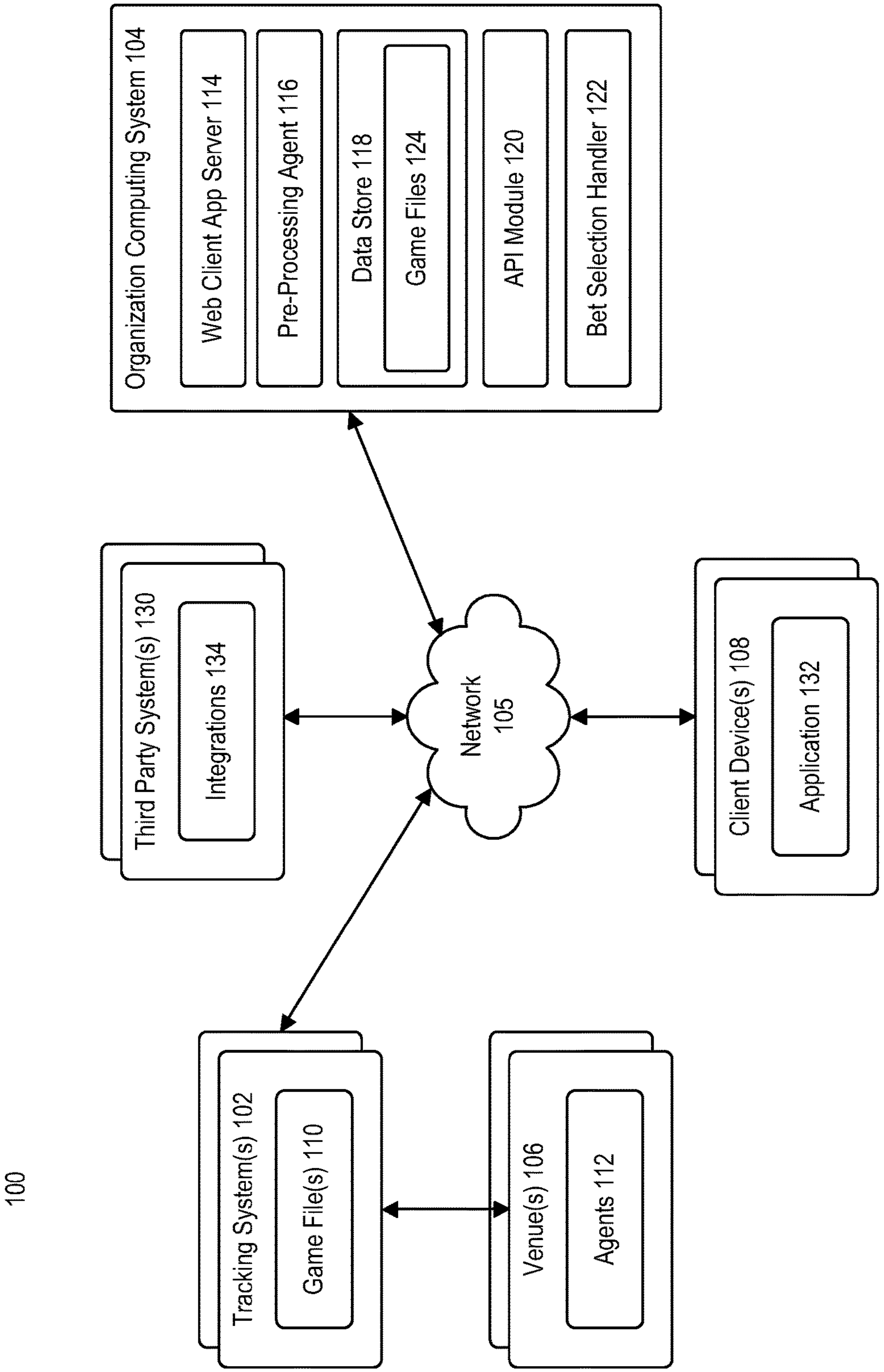
FIG. 1 is a block diagram illustrating a computing environment, according to example embodiments.

FIG. 1 is a block diagram illustrating a computing environment 100, according to example embodiments. Computing environment 100 may include tracking system 102, organization computing system 104, one or more client devices 108, and one or more third party systems 130 communicating via network 105.

Network 105 may be of any suitable type, including individual connections via the Internet, such as cellular or Wi-Fi networks. In some embodiments, network 105 may connect terminals, services, and mobile devices using direct connections, such as radio frequency identification (RFID), near-field communication (NFC), Bluetooth™, low-energy Bluetooth™ (BLE), Wi-Fi™ ZigBee™, ambient backscatter communication (ABC) protocols, USB, WAN, or LAN. Because the information transmitted may be personal or confidential, security concerns may dictate one or more of these types of connection be encrypted or otherwise secured. In some embodiments, however, the information being transmitted may be less personal, and therefore, the network connections may be selected for convenience over security.

Network 105 may include any type of computer networking arrangement used to exchange data or information. For example, network 105 may be the Internet, a private data network, virtual private network using a public network and/or other suitable connection(s) that enables components in computing environment 100 to send and receive information between the components of environment 100.

Tracking system 102 may be positioned in a venue 106. For example, venue 106 may be configured to host a sporting event that includes one or more agents 112. Tracking system 102 may be configured to capture the motions of all agents (i.e., players) on the playing surface, as well as one or more other objects of relevance (e.g., ball, referees, etc.). In some embodiments, tracking system 102 may be an optically-based system using, for example, a plurality of fixed cameras. For example, a system of six stationary, calibrated cameras, which project the three-dimensional locations of players and the ball onto a two-dimensional overhead view of the court may be used. In another example, a mix of stationary and non-stationary cameras may be used to capture motions of all agents on the playing surface as well as one or more objects or relevance. As those skilled in the art recognize, utilization of such tracking system (e.g., tracking system 102) may result in many different camera views of the court (e.g., high sideline view, free-throw line view, huddle view, face-off view, end zone view, etc.). In some embodiments, tracking system 102 may be used for a broadcast feed of a given match. In such embodiments, each frame of the broadcast feed may be stored in a game file 110.

In some embodiments, game file 110 may further be augmented with other event information corresponding to event data, such as, but not limited to, game event information (pass, made shot, turnover, etc.) and context information (current score, time remaining, etc.).

Tracking system 102 may be configured to communicate with organization computing system 104 via network 105. Organization computing system 104 may be configured to manage and analyze the data captured by tracking system 102. Organization computing system 104 may include at least a web client application server 114, a pre-processing agent 116, a data store 118, an application programming interface (API) module 120, and a bet selection handler 122. Each of pre-processing agent 116, API module 120, and bet selection handler 122 may be comprised of one or more software modules. The one or more software modules may be collections of code or instructions stored on a media (e.g., memory of organization computing system 104) that represent a series of machine instructions (e.g., program code) that implements one or more algorithmic steps. Such machine instructions may be the actual computer code the processor of organization computing system 104 interprets to implement the instructions or, alternatively, may be a higher level of coding of the instructions that is interpreted to obtain the actual computer code. The one or more software modules may also include one or more hardware components. One or more aspects of an example algorithm may be performed by the hardware components (e.g., circuitry) itself, rather as a result of the instructions.

Data store 118 may be configured to store one or more game files 124. Each game file 124 may include video data of a given match. For example, the video data may correspond to a plurality of video frames captured by tracking system 102. In some embodiments, the video data may correspond to broadcast data of a given match, in which case, the video data may correspond to a plurality of video frames of the broadcast feed of a given match. Generally, such information may be referred to herein as "tracking data."

Pre-processing agent 116 may be configured to process data retrieved from data store 118. For example, pre-processing agent 116 may be configured to generate game files 124 stored in data store 118. For example, pre-processing agent 116 may be configured to generate a game file 124 based on data captured by tracking system 102.

API module 120 may be configured to manage one or more APIs associated with organization computing system 104. For example, one or more APIs associated with organization computing system 104 may allow a third party system 130 to access functionality of bet selection handler 122.

Bet selection handler 122 may be configured to analyze a proposed bet selection from a bettor or user and provide the bettor or user with feedback regarding the proposed bet selection. In some embodiments, a proposed bet selection may include one or more parameters associated therewith. In some embodiments, the proposed bet selection may include a "wager." A wager may refer to the monetary amount staked or bet. In some embodiments, the proposed bet selection may be placed on a market. A market may refer to an occurrence of an event on which it is possible to bet. For example, "which team to score first," "winner of the match," and "number of passing yards" are all examples of markets. In some embodiments, the proposed bet selection may include a selection. A selection may refer to the choice of a specific outcome from within the market. Continuing with the above examples, "Team A to score first," Team B to win," and "300-400 passing yards," are all example selections in the aforementioned markets. In some embodiments, the proposed bet selection may include a bet. A bet may refer to one or more selections, with an attached "handle" or "stake," which may be "struck" or "accepted" by an operator (e.g., a sports book).

In some embodiments, bet selection handler 122 may be further configured to generate recommendations for the bettor or user based on the proposed bet selection using actual data. For example, bet selection handler 122 may be configured to generate recommendations for the bettor or user based on historical event information pulled from data store 118, as well as real-time or near real-time data captured by tracking system 102.

For example, a user may generate a proposed bet selection to be submitted to an operator. Using a specific example, the user may provide a proposed bet selection that Mohamed Salah on Liverpool F.C. will score over 3 goals in today's game against Arsenal F.C. Responsive to receiving this proposed bet selection, bet selection handler 122 may generate insights related to the proposed bet selection. For example, bet selection handler 122 may query data store 118 for statistics related to Mohamed Salah, Liverpool, and Arsenal. More specifically, bet selection handler 122 may query data store 118 for statistics related to how often Salah has scored 2 or more goals, how often Salah has scored 3 or more goals, how many times Salah had a multigoal game, how many times Liverpool has scored 3 or more goals in a game, how many times Arsenal has given up 3 or more goals in a game, how many times Arsenal has given up 3 or more goals to a single player in the game, and the like. In addition, bet selection handler 122 may analyze the data retrieved from data store 118 to identify trends in the data. For example, bet selection handler 122 may notify the user of an upward trends in the user data. Using a specific example, bet selection handler 122 may generate an insight that: "Salah has scored 3 or more goals two times across 100 games of his career; both those times have occurred within the last five games."

In some embodiments, insights may take the form of factual snippets of editorial content. For example, an insight may read: "Did you know Ronaldo has scored 5 goals against Team A in his last 10 appearances." In some embodiments, insights may take the form of graphical visualizations. For example, bet selection handler 122 may generate two-dimensional or three-dimensional recreations of historical events or positional indicators on a pitch indicating where certain events took place; these visualizations may be linked to "player A to score outside the box," for example. In some embodiments, insights may take the form of other forms of data led visual feedback. For example, bet selection handler 122 may generate charts, graphs, and/or tables, in either static or dynamic forms (e.g., the ability to click on a chart element, which then directs the user to a secondary related chart).

In some embodiments, in addition to or in lieu of using data from data store 118, bet selection handler 122 may utilize live data to generate the insights. For example, bet selection handler 122 may utilize one or more of line up information, event data, team news (e.g., 'rumors player A has a leg injury') to generate the various insights.

In some embodiments, bet selection handler 122 may be configured to generate suggestions for the user based on the pulled statistics. For example, bet selection handler 122 may analyze the data and determine Sadio Mané is a better option for scoring 3 or more goals based on his statistics. Continuing with the above example, bet selection handler 122 may determine that the last two times Mane has played Arsenal, Mane has scored 3 or more goals. Accordingly, bet selection handler 122 may suggest that Mane may be the better wager, based on a comparison between Salah's statistics and Mane's statistics.

In some embodiments, bet selection handler 122 may be configured to take into account the odds of the proposed bet selection when generating suggestions for the user. For example, bet selection handler 122 may receive information related to odds for the proposed bet selection and a proposed wager of the user. Bet selection handler 122 may generate a suggested wager to replace the proposed bet selection based on the odds and proposed wager information. For example, bet selection handler 122 may identify a suggested wager that may be more likely to happen, but at the same time may generate a similar return based on the odds for the suggested wager.

In some embodiments, bet selection handler 122 may also allow for user configurability. For example, a user may be able to select a threshold for a range of odds that may be acceptable to the user. In this manner, if a user submitted a proposed bet selection with 80/1 odds, bet selection handler 122 may not suddenly propose a new bet selection at 10/1 odds. In some embodiments, such configurability may be set at an operator level. In some embodiments, an operator may be able to facilitate such functionality through one or more application programming interfaces (APIs) associated with organization computing system 104 that may allow the operator to set a threshold at a user level.

In some embodiments, bet selection handler 122 may be configured to handle a multi-leg wager (e.g., an accumulator or parlay). For example, for each leg of the multi-leg wager, bet selection handler 122 may generate insights related to the proposed bet selection and/or suggestions for each leg of the multi-leg wager. In additional, bet selection handler 122 may generate additional insights and/or suggestions based on the combination of wagers. For example, a user may generate a parlay that includes a first leg (Salah will score 2 or more goals) and a second leg (Mane will have 2 or more assists). In response to this query, bet selection handler 122 may generate insights, such as, but not limited to: a number of times Salah has scored 2 or more goals and Mane has had 2 or more assists; a number of times Salah has scored 2 or more goals and another player has had 2 or more assists; a number of times Mane has had 2 or more assists and another player has scored 2 or more goals; and the like.

In some embodiments, bet selection handler 122 may be configured to optimize or improve a proposed bet selection. For example, a user may provide bet selection handler 122 with one or more of an event, a number of legs, and a risk level (e.g., scale of 1-10 from least risky to most risky) so that bet selection handler 122 can build a proposed bet selection for the user. Bet selection handler 122 may be configured to generate the proposed bet selection based on data retrieved from data store 118. For example, bet selection handler 122 may utilize one or more artificial intelligence models to analyze the data and generate a proposed bet selection in accordance with the constraints set by the user.

In some embodiments, the optimize or improvement feature may allow users to input a simple ruleset that would automatically replace selections with those more likely to win within a set price range.

In some embodiments, bet selection handler 122 may be configured to automatically set, not just the selection, but also the stake/wager. Bet selection handler 122 may then be configurated to actually execute bet placement itself (e.g., "automation of bet striking").

In some embodiments, bet selection handler 122 may be configured to continually generate insights for the user following initiation of the event. For example, following initiation of the event between Liverpool and Arsenal, bet selection handler 122 may continually pull data from data store 118 and analyze the data to generate insights for the user. If, for example, at half Salah has only scored one goal, bet selection handler 122 may provide the user with second half statistics related to Salah, Liverpool, and/or Arsenal. For example, bet selection handler 122 may provide the user with the insight: "Salah has only score one goal in the second half this season" or "Arsenal has the best second half defense in the league." Based on this insight, the user may be motivated to "cash out" and take reduced winnings for their wager. Alternatively, bet selection handler 122 may provide the user with insight that Salah typically saves his goal scoring for the second half. In such case, the user may be motivated to not cash out and see the wager through.

In some embodiments, rather than starting with a proposed bet selection, bet selection handler 122 may allow the user to operator a discovery style experience. For example, a user may start with an analytics style experience of exploring the various sports data. As the user interacts with the sports data (e.g., historical game data, live game data, etc.), bet selection handler 122 may provide the user with relevant selections. Using a specific example, a user may be presented with a table for Event A that illustrates the top scorers on both teams. The user may click on Player A who scored 5 goals. The user may be presented with a related table that shows the means in which Player A has scored (e.g., headers, corner kicks, free kicks, outside the box, inside the box, and the like). The user may be able to drive further into the data by selecting "inside the box" statistics. The user may be shown a graphical representation of the location of these shots in a pitch view. Bet selection handler 122 may then prompt the user with a relevant bet selection: "Player A to score inside the box 5/1." In this manner, an operator may configure bet selection handler 122 to present data and insights to stimulate betting activity, rather than starting with a proposed bet selection followed by the insights related to that proposed bet selection.

Client device 108 may be in communication with organization computing system 104 via network 105. Client device 108 may be operated by a user. For example, client device 108 may be a mobile device, a tablet, a desktop computer, or any computing system having the capabilities described herein. Users may include, but are not limited to, individuals such as, for example, subscribers, clients, prospective clients, or customers of an entity associated with organization computing system 104, such as individuals who have obtained, will obtain, or may obtain a product, service, or consultation from an entity associated with organization computing system 104.

Client device 108 may include at least application 132. Application 132 may be representative of a web browser that allows access to a website or a stand-alone application. Client device 108 may access application 132 to access one or more functionalities of organization computing system 104. Client device 108 may communicate over network 105 to request a webpage, for example, from web client application server 114 of organization computing system 104. For example, client device 108 may be configured to execute application 132 to access functionality of bet selection handler 122. Via application 132, a user may be able to build a proposed bet selection for submission to bet selection handler 122. The content that is displayed to client device 108 may be transmitted from web client application server 114 to client device 108, and subsequently processed by application 132 for display through a graphical user interface (GUI) of client device 108.

In some embodiments, client device 108 may be configured to communicate with one or more third party systems 130 (generally, "third party system 130") via network 105. Each third party system 130 may be representative of one or more servers associated with a respective operator. Each third party system 130 may include one or more integrations 134. Each integration 134 may be configured to interface with one or more APIs of organization computing system 104. For example, a user may utilize application 132 to access a website or application associated with a third party system 130. Via the website or application associated with third party system 130, a user may build or submit a wager. One or more integrations 134 may allow a user to submit a proposed bet selection to bet selection handler 122, from a webpage or application associated with third party system 130, via the one or more APIs managed by API module 120. In this manner, functionality of bet selection handler 122 may be integrated with, or built into, a website or application associated with each third party system 130.

Although not shown, in some embodiments other parties may be able to communicate with organization computing system 104. For example, an affiliate or media company with a betting partnership may access functionality of organization computing system 104 outside of bets being struck on their site.

Figure 2:
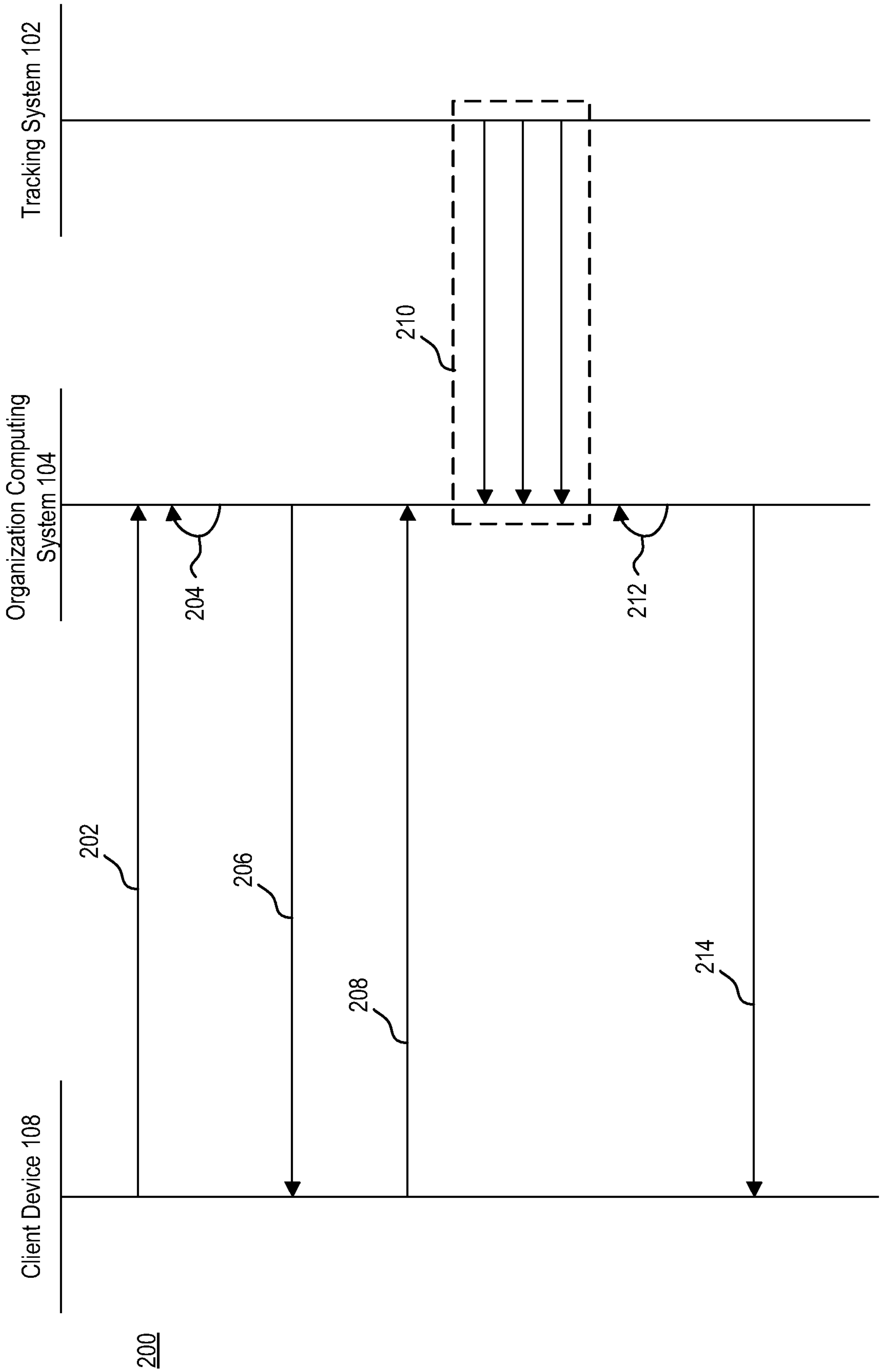
FIG. 2 is a block diagram illustrating communication among components of the computing environment of FIG. 1, according to example embodiments.

FIG. 2 is a block diagram 200 illustrating communication among components of computing environment 100, according to example embodiments. As provided above, block diagram 200 may provide exemplary communications between client device 108 and organization computing system 104 directly.

At block 202, client device 108 may provide organization computing system 104 with a proposed bet selection. In some embodiments, client device 108 may provide organization computing system 104 with a proposed bet selection via application 132 executing thereon. In some embodiments, the proposed bet selection may include, at least, an event in which the wager will take place (e.g., Arsenal v. Liverpool at 10 am ET on Saturday, Aug. 20, 2021). In some embodiments, the proposed bet selection may further include odds information for the proposed bet selection (e.g., Salah over 3 goals at 25 to 1 odds). In some embodiments, the proposed bet selection may further include a proposed wager (e.g., $2000).

At block 204, organization computing system 104 may receive the proposed bet selection from client device 108. Bet selection handler 122 may analyze the proposed bet selection and generate a plurality of queries related to the proposed bet selection. For example, bet selection handler 122 may provide the user with feedback regarding the proposed bet selection based on queries to data store 118 related to one or more of Salah's individual statistics, Liverpool's statistics, and/or Arsenal's statistics. Using this information, bet selection handler 122 may generate one or more insights related to the proposed bet selection.

In some embodiments, bet selection handler 122 may be further configured to generate recommendations for the bettor or user based on the proposed bet selection using actual data. For example, bet selection handler 122 may be configured to generate recommendations for the bettor or user based on historical event information pulled from data store 118.

At block 206, organization computing system 104 may provide client device 108 with the information regarding the proposed bet selection. For example, organization computing system 104 may provide client device 108 with statistics related to Salah's individual goal scoring, Liverpool's goal scoring, and Arsenal's goal allowance data. In some embodiments, organization computing system 104 may provide insights related to the raw data. For example, organization computing system 104 may provide client device 108 with the insight: Salah has scored more than 3 goals twice in his career.

In some embodiments, organization computing system 104 may provide client device 108 with a suggested modification to the proposed bet selection. For example, bet selection handler 122 may analyze the data and determine Sadio Mane is a better option for scoring 3 or more goals based on his statistics. Continuing with the above example, bet selection handler 122 may determine that the last two times Mane has played Arsenal, Mane has scored 3 or more goals. Accordingly, bet selection handler 122 may suggest that Mane may be the better wager, based on a comparison between Salah's statistics and Mane's statistics.

At step 208, client device 108 may provide organization computing system 104 with an indication that the user has placed the wager with an operator. In some embodiments, client device 108 may notify organization computing system 104 that the use has converted the proposed bet selection into an actual wager. In some embodiments, client device 108 may notify organization computing system 104 that the user has adopted the suggested wager and converted the suggested wager into an actual wager. In either situation, client device 108 may notify organization computing system 104 such that organization computing system 104 may provide the user with real-time, near real-time, or periodic insights during the course of the event.

At step 210, organization computing system 104 may receive streams of event data from tracking system 102. For example, organization computing system 104 may receive updated information about the event related to the wager as the event occurs from tracking system 102.

At step 212, organization computing system 104 may analyze the streams of event data to generate new insights related to the wager. For example, following initiation of the event between Liverpool and Arsenal, bet selection handler 122 may continually pull data from data store 118 and analyze the data to generate insights for the user. If, for example, at half Salah has only scored one goal, bet selection handler 122 may provide the user with second half statistics related to Salah, Liverpool, and/or Arsenal. For example, bet selection handler 122 may provide the user with the insight: "Salah has only score one goal in the second half this season" or "Arsenal has the best second half defense in the league." Based on this insight, the user may be motivated to "cash out" and take reduced winnings for their wager. Alternatively, bet selection handler 122 may provide the user with insight that Salah typically saves his goal scoring for the second half. In such case, the user may be motivated to not cash out and see the wager through.

At step 214, organization computing system 104 may provide the new insights to client device 108.

Figure 3:
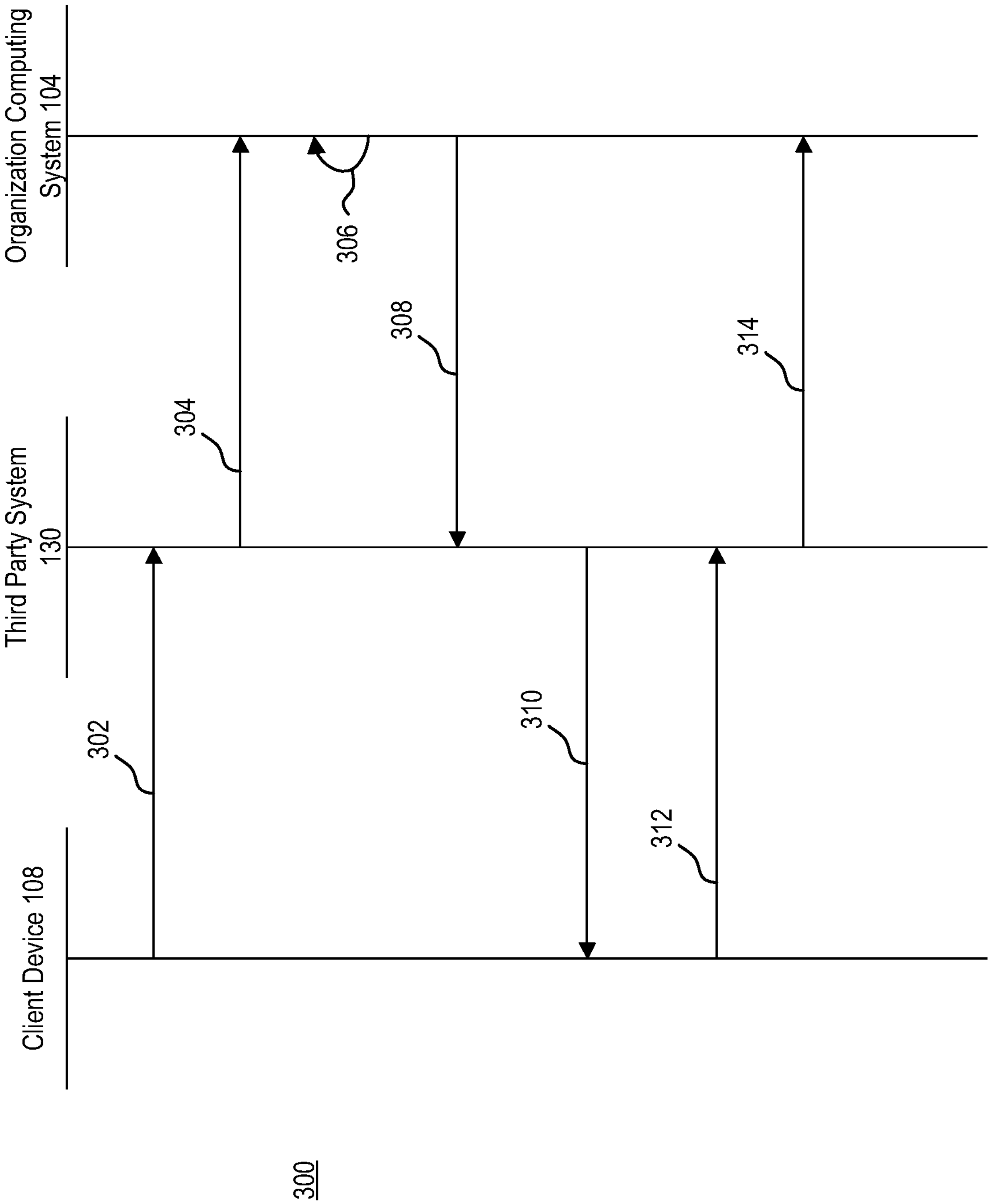
FIG. 3 is a block diagram illustrating communication among components of the computing environment of FIG. 1, according to example embodiments.

FIG. 3 is a block diagram 300 illustrating communication among components of computing environment 100, according to example embodiments. As provided above, block diagram 300 may provide exemplary communications among client device 108, third party system 130, and organization computing system 104.

At block 302, client device 108 may provide third party system 130 with a proposed bet selection. In some embodiments, client device 108 may provide third party system 130 with a proposed bet selection via application 132 executing thereon. In some embodiments, the proposed bet selection may include, at least, an event in which the wager will take place (e.g., Arsenal v. Liverpool at 10 am ET on Saturday, Aug. 20, 2021). In some embodiments, the proposed bet selection may further include odds information for the proposed bet selection (e.g., Salah over 3 goals at 25 to 1 odds). In some embodiments, the proposed bet selection may further include a proposed wager (e.g., $2000).

At block 304, third party system 130 may utilize one or more integrations 134 to provide the proposed bet selection to organization computing system 104. For example, third party system 130 may invoke one or more APIs managed by API module 120 to forward or send the proposed bet selection to organization computing system 104 for further analysis.

At block 306, organization computing system 104 may receive the proposed bet selection from third party system 130. Bet selection handler 122 may analyze the proposed bet selection and generate a plurality of queries related to the proposed bet selection. For example, bet selection handler 122 may provide the user with feedback regarding the proposed bet selection based on queries to data store 118 related to one or more of Salah's individual statistics, Liverpool's statistics, and/or Arsenal's statistics. Using this information, bet selection handler 122 may generate one or more insights related to the proposed bet selection.

In some embodiments, bet selection handler 122 may be further configured to generate recommendations for the bettor or user based on the proposed bet selection using actual data. For example, bet selection handler 122 may be configured to generate recommendations for the bettor or user based on historical event information pulled from data store 118.

At block 308, organization computing system 104 may provide third party system 130 with the information regarding the proposed bet selection. For example, organization computing system 104 may provide third party system 130 with statistics related to Salah's individual goal scoring, Liverpool's goal scoring, and Arsenal's goal allowance data. In some embodiments, organization computing system 104 may provide insights related to the raw data. For example, organization computing system 104 may provide third party system 130 with the insight: Salah has scored more than 3 goals twice in his career.

In some embodiments, organization computing system 104 may provide third party system 130 with a suggested modification to the proposed bet selection. For example, bet selection handler 122 may analyze the data and determine Sadio Mane is a better option for scoring 3 or more goals based on his statistics. Continuing with the above example, bet selection handler 122 may determine that the last two times Mane has played Arsenal, Mane has scored 3 or more goals. Accordingly, bet selection handler 122 may suggest that Mane may be the better wager, based on a comparison between Salah's statistics and Mane's statistics.

At block 310, third party system 130 may provide the statistics, insights, and/or recommendations generated by bet selection handler 122 to client device 108. For example, third party system 130 may update a webpage accessed by the user with the statistics, insights, and/or recommendations generated by bet selection handler 122 for presentation to the user.

Although blocks 308-310 may involve organization computing system 104 providing the statistics, insights, and/or recommendations to third party system 130, those skilled in the art recognize that organization computing system 104 may provide this data directly to client device 108 via one or more integrations 134.

At block 312, client device 108 may provide third party system 130 with an indication that the user has placed the wager with an operator. In some embodiments, client device 108 may submit an actual wager based on the proposed bet selection to third party system 130. In some embodiments, client device 108 may submit, as the actual wager, the suggested wager and generated by organization computing system 104.

At block 314, third party system 130 may notify organization computing system 104 of the actual wager. For example, third party system 130 may notify organization computing system 104 of the actual wager, such that organization computing system 104 may provide the user with real-time, near real-time, or periodic insights during the course of the event.

Figure 4:
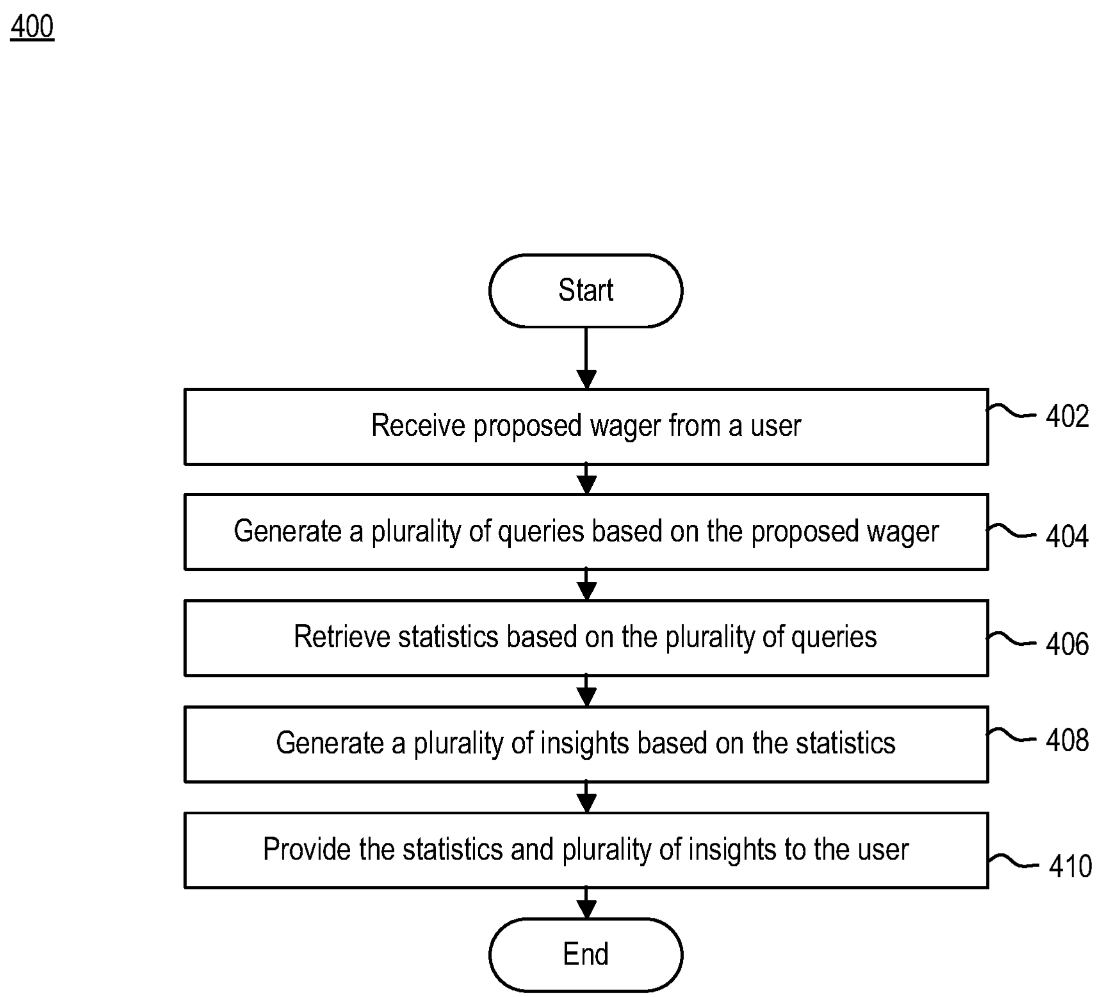
FIG. 4 is a block diagram illustrating a method of generating feedback and/or recommendations regarding a proposed bet selection, according to example embodiments, according to example embodiments.

FIG. 4 is a flow diagram illustrating a method 400 of generating feedback and/or recommendations regarding a proposed bet selection, according to example embodiments. Method 400 may begin at step 402.

At step 402, organization computing system 104 may receive a proposed bet selection. In some embodiments, the proposed bet selection may be received directly from client device 108. In some embodiments, the proposed bet selection may be received from client device 108 via third party system 130. Third party system 130 may be representative of an operator configured to handle an actual wager when placed. In some embodiments, the proposed bet selection may include, at least, an event in which the wager will take place (e.g., Arsenal v. Liverpool at 10 am ET on Saturday, Aug. 20, 2021). In some embodiments, the proposed bet selection may further include odds information for the proposed bet selection (e.g., Salah over 3 goals at 25 to 1 odds). In some embodiments, the proposed bet selection may further include a proposed wager (e.g., $2000).

At step 404, organization computing system 104 may generate a plurality of queries based on the proposed bet selection. For example, bet selection handler 122 may provide the user with feedback regarding the proposed bet selection based on queries to data store 118 related to one or more of Salah's individual statistics, Liverpool's statistics, and/or Arsenal's statistics. Using this information, bet selection handler 122 may generate one or more insights related to the proposed bet selection.

In some embodiments, the proposed bet selection may be a multi-leg wager (e.g., an accumulator or parlay). In such embodiments, bet selection handler 122 may generate a plurality of queries related to each leg of the multi-leg wager individually, as well as the multi-leg wager in the aggregate.

At step 406, organization computing system 104 may retrieve statistics based on the plurality of queries. For example, bet selection handler 122 may use the plurality of queries generated at step 404 to pull or retrieve relevant data from data store 118.

At step 408, organization computing system 104 may generate a plurality of insights related to the proposed bet selection based on the statistics. For example, bet selection handler 122 may analyze the statistics to generate insights related to the proposed bet selection. Using a specific example, bet selection handler 122 may generate an insight that: "Salah has scored 3 or more goals two times across 100 games of his career; both those times have occurred within the last five games."

At step 410, organization computing system 104 may provide the statistics and plurality of insights to the user. In some embodiments, bet selection handler 122 may interface directly with client device 108 and provide the statistics and plurality of insights to the user via application 132 executing thereon. In some embodiments, bet selection handler 122 may provide the statistics and plurality of insights to the user by way of third party system 130.

Figure 5A:
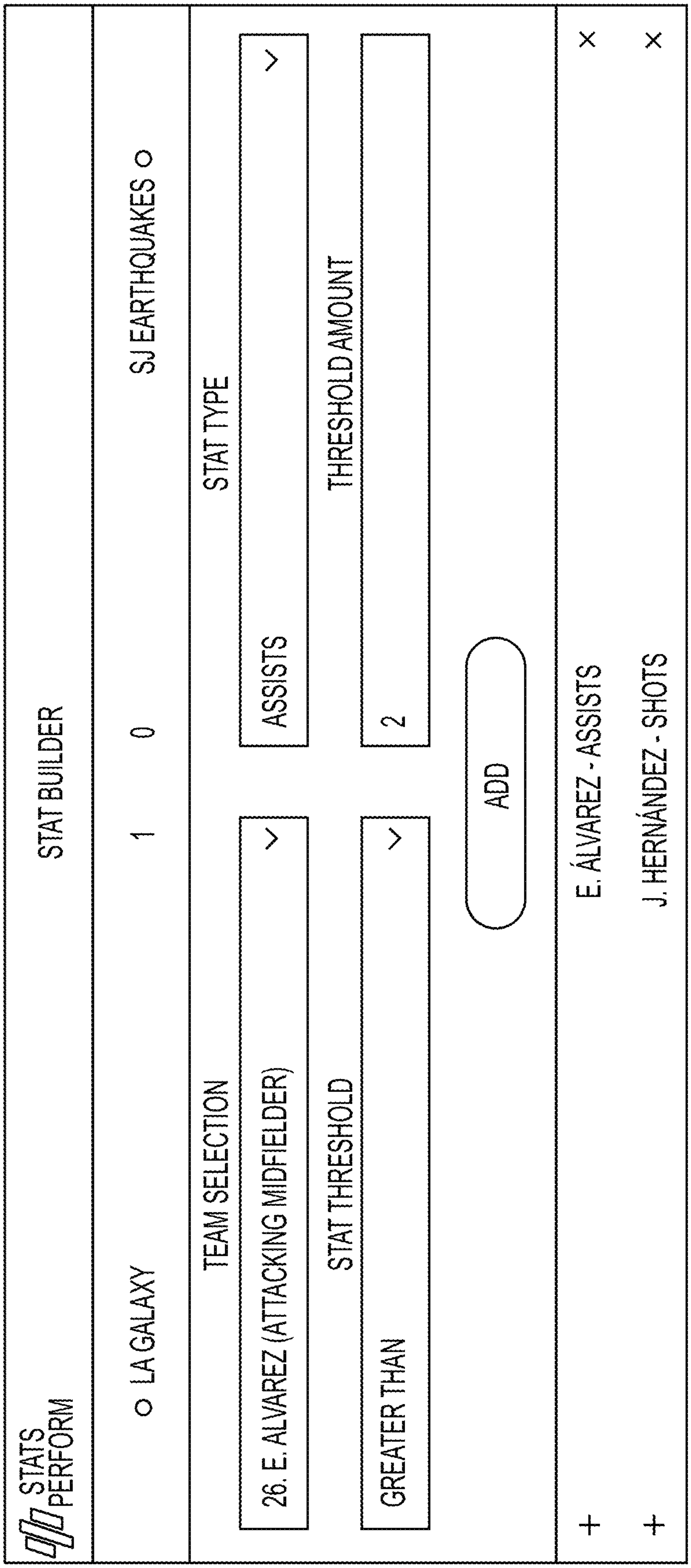
FIG. 5A is a block diagram illustrating an exemplary graphical user interface, according to example embodiments

FIG. 5A illustrates an exemplary graphical user interface (GUI) 500, according to example embodiments. As provided, GUI 500 may be presented to a user via application 132 executing on client device 108. In some embodiments, GUI 500 may be generated by organization computing system 104 and rendered within application 132. In some embodiments, GUI 500 may be generated by third party system 130 and rendered within application 132.

As shown, GUI 500 may provide the user with an interface to build a proposed bet selection. In some embodiments, the proposed bet selection may be a single-line or single leg wager. In some embodiments, such as that shown in FIG. 5A, the proposed bet selection may be a multi-leg wager. For example, a user may submit multiple wagers that may be grouped into a single wager, such that, in order to win the wager, each component or leg of the wager must hit.

As shown, the user has submitted a two-leg wager. The first leg of the wager may relate to E. Alvarez generating greater than 2 assists in LA Galaxy's game against SJ Earthquakes; the second leg of the wager may relate to J. Hernandez generating greater than 5 shots against SJ Earthquakes. While both legs of this proposed bet selection are related to the same event, those skilled in the art recognize that individual legs of a wager may be related to different events.

Responsive to submitting this proposed bet selection, information about the proposed bet selection may be provided to bet selection handler 122 for further analysis.

Figure 5B:
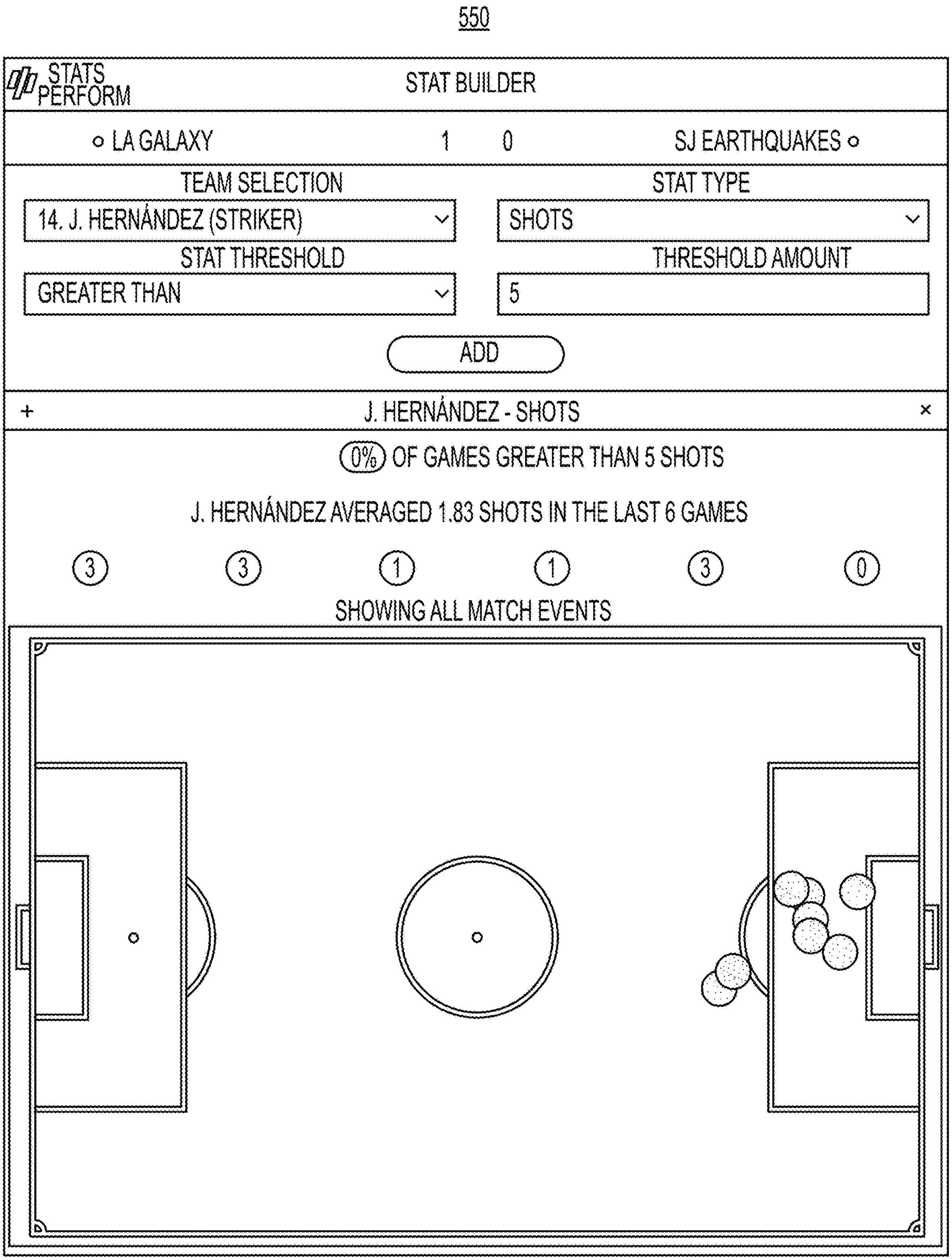
FIG. 5B is a block diagram illustrating an exemplary graphical user interface, according to example embodiments

FIG. 5B illustrates an exemplary graphical user interface (GUI) 550, according to example embodiments. As provided, GUI 550 may be presented to a user via application 132 executing on client device 108. In some embodiments, GUI 500 may be generated by organization computing system 104 and rendered within application 132. In some embodiments, GUI 500 may be generated by third party system 130 and rendered within application 132.

GUI 550 may present additional information and/or insights related to the proposed bet selection. For example, as shown, GUI 550 may include additional information and/or insights related to the second leg of the wager, i.e., Hernandez generated greater than 5 shots. As shown, GUI 550 may include various statistics, such as the number of shots generated by Hernandez in the last 6 events. GUI 550 may further include insights, such as, "0% of games greater than 5 shots" and "J. Hernandez averaged 1.83 shots in the last 6 games."

Figure 6A:
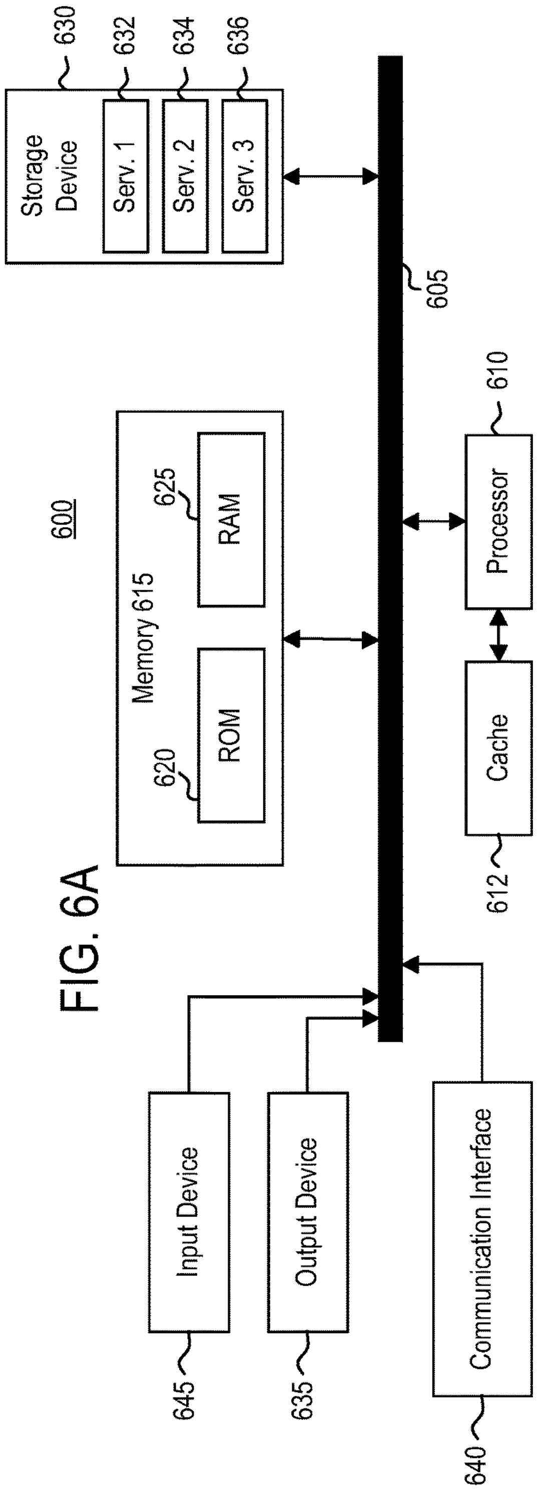
FIG. 6A is a block diagram illustrating a computing device, according to example embodiments.

FIG. 6A illustrates an architecture of computing system 600, according to example embodiments. System 600 may be representative of at least a portion of organization computing system 104. One or more components of system 600 may be in electrical communication with each other using a bus 605. System 600 may include a processing unit (CPU or processor) 610 and a system bus 605 that couples various system components including the system memory 615, such as read only memory (ROM) 620 and random access memory (RAM) 625, to processor 610. System 600 may include a cache of high-speed memory connected directly with, in close proximity to, or integrated as part of processor 610. System 600 may copy data from memory 615 and/or storage device 630 to cache 612 for quick access by processor 610. In this way, cache 612 may provide a performance boost that avoids processor 610 delays while waiting for data. These and other modules may control or be configured to control processor 610 to perform various actions. Other system memory 615 may be available for use as well. Memory 615 may include multiple different types of memory with different performance characteristics. Processor 610 may include any general purpose processor and a hardware module or software module, such as service 1 632, service 2 634, and service 3 636 stored in storage device 630, configured to control processor 610 as well as a special-purpose processor where software instructions are incorporated into the actual processor design. Processor 610 may essentially be a completely self-contained computing system, containing multiple cores or processors, a bus, memory controller, cache, etc. A multi-core processor may be symmetric or asymmetric.

To enable user interaction with the computing system 600, an input device 645 may represent any number of input mechanisms, such as a microphone for speech, a touch-sensitive screen for gesture or graphical input, keyboard, mouse, motion input, speech and so forth. An output device 635 (e.g., display) may also be one or more of a number of output mechanisms known to those of skill in the art. In some instances, multimodal systems may enable a user to provide multiple types of input to communicate with computing system 600. Communications interface 640 may generally govern and manage the user input and system output. There is no restriction on operating on any particular hardware arrangement and therefore the basic features here may easily be substituted for improved hardware or firmware arrangements as they are developed.

Storage device 630 may be a non-volatile memory and may be a hard disk or other types of computer readable media which may store data that are accessible by a computer, such as magnetic cassettes, flash memory cards, solid state memory devices, digital versatile disks, cartridges, random access memories (RAMs) 625, read only memory (ROM) 620, and hybrids thereof.

Storage device 630 may include services 632, 634, and 636 for controlling the processor 610. Other hardware or software modules are contemplated. Storage device 630 may be connected to system bus 605. In one aspect, a hardware module that performs a particular function may include the software component stored in a computer-readable medium in connection with the necessary hardware components, such as processor 610, bus 605, output device 635, and so forth, to carry out the function.

Figure 6B:
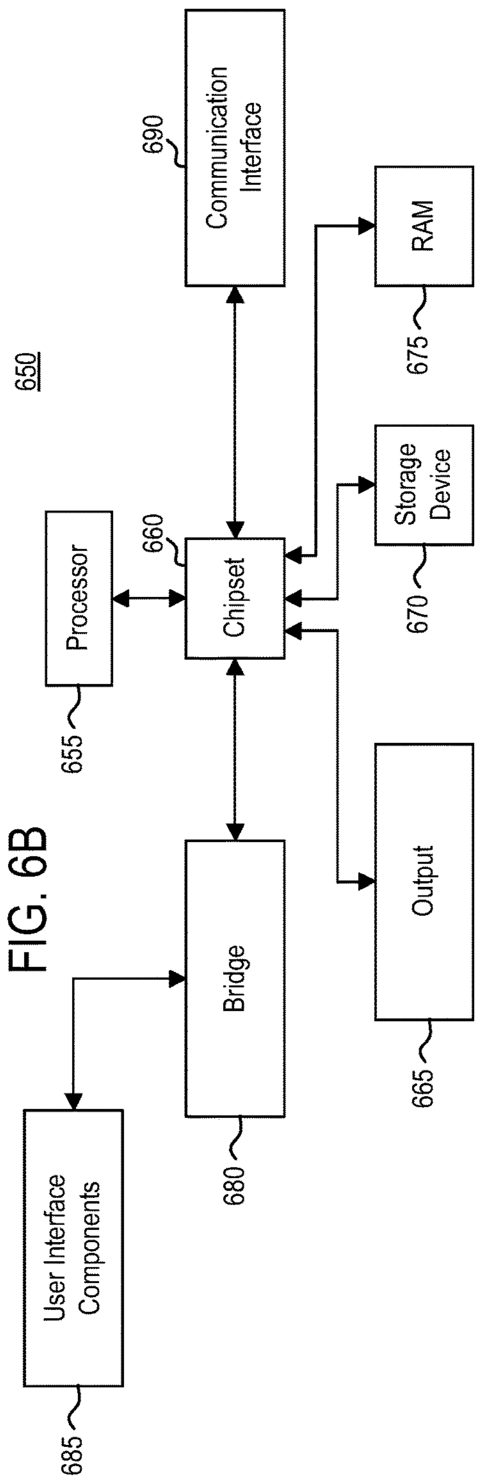
FIG. 6B is a block diagram illustrating a computing device, according to example embodiments.

FIG. 6B illustrates a computer system 650 having a chipset architecture that may represent at least a portion of organization computing system 104. Computer system 650 may be an example of computer hardware, software, and firmware that may be used to implement the disclosed technology. System 650 may include a processor 655, representative of any number of physically and/or logically distinct resources capable of executing software, firmware, and hardware configured to perform identified computations. Processor 655 may communicate with a chipset 660 that may control input to and output from processor 655. In this example, chipset 660 outputs information to output 665, such as a display, and may read and write information to storage device 670, which may include magnetic media, and solid-state media, for example. Chipset 660 may also read data from and write data to RAM 675. A bridge 680 for interfacing with a variety of user interface components 685 may be provided for interfacing with chipset 660. Such user interface components 685 may include a keyboard, a microphone, touch detection and processing circuitry, a pointing device, such as a mouse, and so on. In general, inputs to system 650 may come from any of a variety of sources, machine generated and/or human generated.

Chipset 660 may also interface with one or more communication interfaces 690 that may have different physical interfaces. Such communication interfaces may include interfaces for wired and wireless local area networks, for broadband wireless networks, as well as personal area networks. Some applications of the methods for generating, displaying, and using the GUI disclosed herein may include receiving ordered datasets over the physical interface or be generated by the machine itself by processor 655 analyzing data stored in storage device 670 or RAM 675. Further, the machine may receive inputs from a user through user interface components 685 and execute appropriate functions, such as browsing functions by interpreting these inputs using processor 655.

It may be appreciated that example systems 600 and 650 may have more than one processor 610 or be part of a group or cluster of computing devices networked together to provide greater processing capability.

While the foregoing is directed to embodiments described herein, other and further embodiments may be devised without departing from the basic scope thereof. For example, aspects of the present disclosure may be implemented in hardware or software or a combination of hardware and software. One embodiment described herein may be implemented as a program product for use with a computer system. The program(s) of the program product define functions of the embodiments (including the methods described herein) and can be contained on a variety of computer-readable storage media. Illustrative computer-readable storage media include, but are not limited to: (i) non-writable storage media (e.g., read-only memory (ROM) devices within a computer, such as CD-ROM disks readably by a CD-ROM drive, flash memory, ROM chips, or any type of solid-state non-volatile memory) on which information is permanently stored; and (ii) writable storage media (e.g., floppy disks within a diskette drive or hard-disk drive or any type of solid state random-access memory) on which alterable information is stored. Such computer-readable storage media, when carrying computer-readable instructions that direct the functions of the disclosed embodiments, are embodiments of the present disclosure.

It will be appreciated to those skilled in the art that the preceding examples are exemplary and not limiting. It is intended that all permutations, enhancements, equivalents, and improvements thereto are apparent to those skilled in the art upon a reading of the specification and a study of the drawings are included within the true spirit and scope of the present disclosure. It is therefore intended that the following appended claims include all such modifications, permutations, and equivalents as fall within the true spirit and scope of these teachings.

The invention claimed is:

1. A computer-implemented method for generating insights using an artificial intelligence model, the method comprising:

- receiving, by a computing system, a proposed bet selection for an event from a user interface, wherein the proposed bet selection comprises team information and opponent information;
- generating, by the computing system, a plurality of queries for a data store by analyzing the proposed bet selection;
- retrieving, by the computing system and from the data store, historical data related to the proposed bet selection according to the plurality of queries;
- receiving, by the computing system, a tracking feed for the event, wherein the tracking feed comprises at least one of a video feed and a tracking system output;
- generating, by the computing system, tracking data for the event using the tracking feed;
- providing, by the computing system, one or more parameters, the historical data, the tracking data, and the proposed bet selection, to the artificial intelligence model trained to identify associations between the one or more parameters, the historical data, the tracking data, and the proposed bet selection to output a plurality of insights associated with the proposed bet selection;

generating, by the computing system, a visual recreation of the historical data, wherein the visual recreation is generated based on at least one of the historical data, the plurality of insights, or the tracking data; and providing, by the computing system, the historical data, the visual recreation, and the plurality of insights to the user interface.

2. The method of claim 1, wherein the proposed bet selection is a multi-leg wager comprising a first leg and a second leg.

3. The method of claim 2, wherein generating, by the computing system, the plurality of queries by analyzing the proposed bet selection comprises:

generating a first set of queries related to the first leg of the multi-leg wager;

generating a second set of queries related to the second leg of the multi-leg wager; and generating a third set of queries related to a combination of the first leg and the second leg of the multi-leg wager.

4. The method of claim 1, further comprising:

analyzing, by the computing system, the historical data related to the proposed bet selection and generating a suggested wager based on the historical data.

5. The method of claim 1, further comprising:

receiving, by the computing system, an indication that the proposed bet selection was converted to an actual wager;

monitoring, by the computing system, real-time event data related to the event associated with the actual wager; and generating, by the computing system, additional insights based on the real-time event data and the actual wager.

6. The method of claim 1, further comprising:

receiving, by the computing system, odds information related to the proposed bet selection; and receiving, by the computing system, a wager related to the proposed bet selection.

7. The method of claim 6, further comprising:

optimizing, by the computing system, the proposed bet selection based on the odds information, the wager, and a risk tolerance set by the user.

8. A system, comprising:

a processor; and a memory having programming instructions stored thereon, which, when executed by the processor, cause the system to performs operations, comprising:

receiving a proposed bet selection for an event from a user interface, wherein the proposed bet selection comprises team information and opponent information;

generating a plurality of queries for a data store by analyzing the proposed bet selection;

retrieving from the data store, historical data related to the proposed bet selection according to the plurality of queries;

receiving a tracking feed for the event, wherein the tracking feed comprises at least one of a video feed and a tracking system output;

generating tracking data for the event using the tracking feed;

providing one or more parameters, the historical data, the tracking data, and the proposed bet selection, to an artificial intelligence model trained to identify associations between the one or more parameters, the historical data, the tracking data, and the proposed bet selection to output a plurality of insights associated with the proposed bet selection;

generating a visual recreation of the historical data, wherein the visual recreation is generated based on at least one of the historical data, the plurality of insights, or the tracking data; and providing the historical data, the visual recreation, and the plurality of insights to the user interface.

9. The system of claim 8, wherein the proposed bet selection is a multi-leg wager comprising a first leg and a second leg.

10. The system of claim 9, wherein generating the plurality of queries by analyzing the proposed bet selection comprises:

generating a first set of queries related to the first leg of the multi-leg wager;

generating a second set of queries related to the second leg of the multi-leg wager; and generating a third set of queries related to a combination of the first leg and the second leg of the multi-leg wager.

11. The system of claim 8, wherein the operations further comprise:

analyzing the historical data related to the proposed bet selection and generating a suggested wager based on the historical data.

12. The system of claim 8, wherein the operations further comprise:

receiving an indication that the proposed bet selection was converted to an actual wager;

monitoring real-time event data related to the event associated with the actual wager; and generating additional insights based on the real-time event data and the actual wager.

13. The system of claim 8, wherein the operations further comprise:

receiving odds information related to the proposed bet selection; and receiving a wager related to the proposed bet selection.

14. The system of claim 13, wherein the operations further comprise:

optimizing the proposed bet selection based on the odds information, the wager, and a risk tolerance set by the user.

15. A non-transitory computer readable medium including one or more sequences of instructions that, when executed by one or more processors, causes a computing system to perform operations comprising:

receiving, by a computing system, a proposed bet selection for an event from a user interface, wherein the proposed bet selection comprises team information and opponent information;

generating, by the computing system, a plurality of queries for a data store by analyzing the proposed bet selection;

retrieving, by the computing system and from the data store, historical data related to the proposed bet selection according to the plurality of queries;

receiving, by the computing system, a tracking feed for the event, wherein the tracking feed comprises at least one of a video feed and a tracking system output;

generating, by the computing system, tracking data for the event using the tracking feed;

providing, by the computing system, one or more parameters, the historical data, the tracking data, and the proposed bet selection, to an artificial intelligence model trained to identify associations between the one or more parameters, the historical data, the tracking data, and the proposed bet selection to output a plurality of insights associated with the proposed bet selection;

generating, by the computing system, a visual recreation of the historical data, wherein the visual recreation is generated based on at least one of the historical data, the plurality of insights, or the tracking data; and providing, by the computing system, the historical data, the visual recreation, and the plurality of insights to the user interface.

16. The non-transitory computer readable medium of claim 15, wherein the proposed bet selection is a multi-leg wager comprising a first leg and a second leg.

17. The non-transitory computer readable medium of claim 16, wherein generating, by the computing system, the plurality of queries by analyzing the proposed bet selection comprises:

generating a first set of queries related to the first leg of the multi-leg wager;

generating a second set of queries related to the second leg of the multi-leg wager; and generating a third set of queries related to a combination of the first leg and the second leg of the multi-leg wager.

18. The non-transitory computer readable medium of claim 15, further comprising:

analyzing, by the computing system, the historical data related to the proposed bet selection and generating a suggested wager based on the historical data.

19. The non-transitory computer readable medium of claim 15, further comprising:

receiving, by the computing system, an indication that the proposed bet selection was converted to an actual wager;

monitoring, by the computing system, real-time event data related to the event associated with the actual wager; and generating, by the computing system, additional insights based on the real-time event data and the actual wager.

20. The non-transitory computer readable medium of claim 15, further comprising:

receiving, by the computing system, odds information related to the proposed bet selection;

receiving, by the computing system, wager related to the proposed bet selection; and optimizing, by the computing system, the proposed bet selection based on the odds information, the wager, and a risk tolerance set by the user.

* * * * *